(12) United States Patent
Huang

(10) Patent No.: US 7,843,106 B2
(45) Date of Patent: Nov. 30, 2010

(54) MOTOR THAT REDUCES MAGNETIC INTERFERENCE

(75) Inventor: David Huang, Changhua County (TW)

(73) Assignee: Tricore Corporation, Chang-Hua (TW)

( * ) Notice: Subject to any disclaimer, the term of this patent is extended or adjusted under 35 U.S.C. 154(b) by 94 days.

(21) Appl. No.: 12/232,409

(22) Filed: Sep. 17, 2008

(65) Prior Publication Data
US 2009/0284100 A1 Nov. 19, 2009

(51) Int. Cl.
*H02K 1/12* (2006.01)

(52) U.S. Cl. .................. 310/257; 310/49.31; 310/49.33; 310/49.01; 310/49.55; 310/54

(58) Field of Classification Search ............... 310/49 R, 310/49.01–49.55, 257, 54
See application file for complete search history.

(56) References Cited

U.S. PATENT DOCUMENTS

| | | | |
|---|---|---|---|
| 3,757,147 A * | 9/1973 | Lyman, Jr. ............... | 310/49.09 |
| 5,057,732 A * | 10/1991 | Fukaya ..................... | 310/208 |
| 5,260,616 A * | 11/1993 | Mizutani et al. ......... | 310/49.12 |
| 6,825,587 B2 * | 11/2004 | Yajima et al. ............ | 310/90 |
| 2005/0264113 A1 * | 12/2005 | Suzuki et al. ............ | 310/80 |
| 2006/0055278 A1 * | 3/2006 | Zhou ........................ | 310/257 |
| 2006/0055279 A1 * | 3/2006 | Zhan ........................ | 310/257 |
| 2008/0024022 A1 * | 1/2008 | Wu ........................... | 310/71 |

\* cited by examiner

*Primary Examiner*—Quyen Leung
*Assistant Examiner*—Terrance Kenerly
(74) *Attorney, Agent, or Firm*—Bacon & Thomas, PLLC

(57) ABSTRACT

A motor includes a housing formed of a first shell and a second shell, a stator, which is formed of a first yoke, a second yoke, a connecting device and two coils. The first yoke and the second yoke each comprise a terminal holder mounting portion, a race and a plurality of pole pawls respectively extended from the race. The race of the first yoke has the race of the first yoke kept apart from the race of the second yoke at a distance to reduce magnetic interference, the connecting device having a terminal holder fastened to terminal holder mounting portions of the first yoke and second yoke of the stator and a plurality of metal terminals installed in the terminal holder, the coils respectively set between the first yoke and the first shell and between the second yoke and the second shell and respectively electrically connected to the metal terminals, and a rotor formed of a transmission shaft and magnets and inserted through the first yoke and the second yoke and rotatable relative to the stator.

5 Claims, 3 Drawing Sheets

MOTOR THAT REDUCES MAGNETIC INTERFERENCE

BACKGROUND OF THE INVENTION

1. Field of the Invention

The present invention relates to a motor structure and more particularly, to a motor that reduces magnetic interference.

2. Description of the Related Art

A conventional motor, for example, a step motor generally comprises a housing, a rotor and a stator. The housing is comprised of an end cover, a bottom cover and other related component parts, such as axle bearing or bracket. The rotor is comprised of a permanent magnet and a transmission shaft. The stator comprises a coil holder, and a coil formed of an enameled wire and wound round the coil holder. By means of controlling the supply of electric current through the coil, an electromagnetic force is controlled to rotate the motor.

The aforesaid conventional motor design is functional, however it still has drawbacks. The yoke of the stator is formed of a stack of steel plates. Stacking the steel plates into a stack increases magnetic interference. To reduce this magnetic interference problem, a complicated interference preventive structure may be used, complicating the fabrication. Therefore, an improvement in this regard is necessary.

SUMMARY OF THE INVENTION

The present invention has been accomplished under the circumstances in view. It is the main object of the present invention to provide a motor, which has the races of the two yokes of the stator thereof kept part from each other at a predetermined distance to reduce interference between the two adjacent magnetic fields, improving stepping precision. It is another object of the present invention to provide a motor, which the electrical connecting device thereof separately made and then bonded to the terminal holder mounting portions of the yokes of the stator, simplifying the fabrication and lowering magnetic resistance.

To achieve these and other objects of the present invention, the motor comprises a housing, a stator and a rotor. The housing is comprised of a first shell and a second shell, defining an accommodation space and an escape hole. The stator comprises a first yoke, a second yoke, a connecting device and two coils. The first yoke and the second yoke are hollow metal plates made of a magnetic conductive material and stacked together. The first yoke and the second yoke each comprise a terminal holder mounting portion, a race and a plurality of pole pawls respectively extended from the race. The race of the first yoke and the race of the second yoke are kept apart at a distance. The connecting device comprises a terminal holder fastened to the terminal holder mounting portions of the first yoke and second yoke of the stator, and a plurality of metal terminals installed in the terminal holder. The coils are respectively set between the first yoke and the first shell and between the second yoke and the second shell, each having respective lead wires respectively electrically connected to the metal terminals. The rotor is inserted through the first yoke and the second yoke, and rotatable relative to the stator, comprising a transmission shaft and a magnet mounted on the transmission shaft corresponding to the coils.

DETAILED DESCRIPTION OF THE INVENTION

Figure 1:
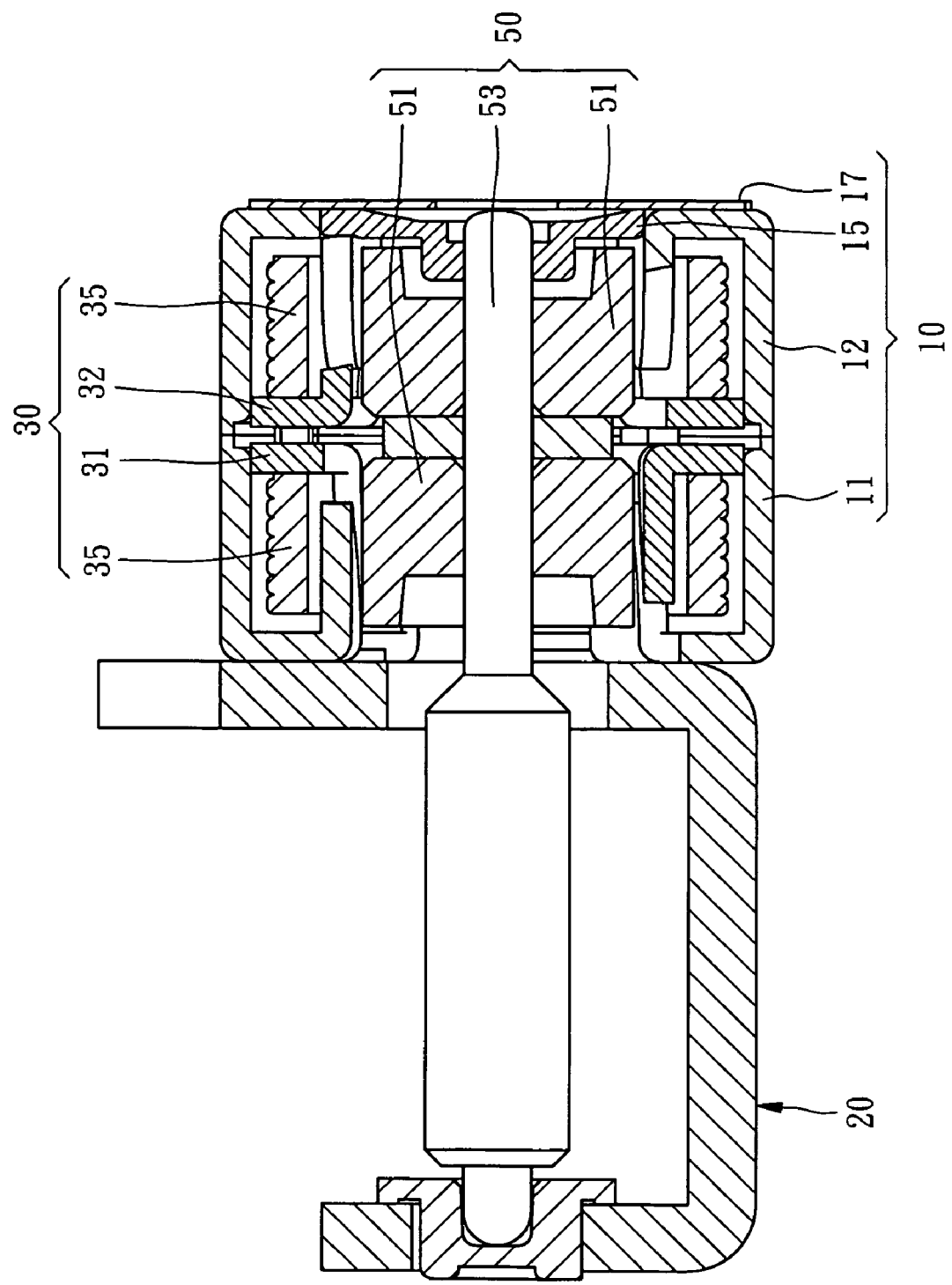
FIG. 1 is a sectional assembly view of a motor in accordance with the present invention.
Figure 3:
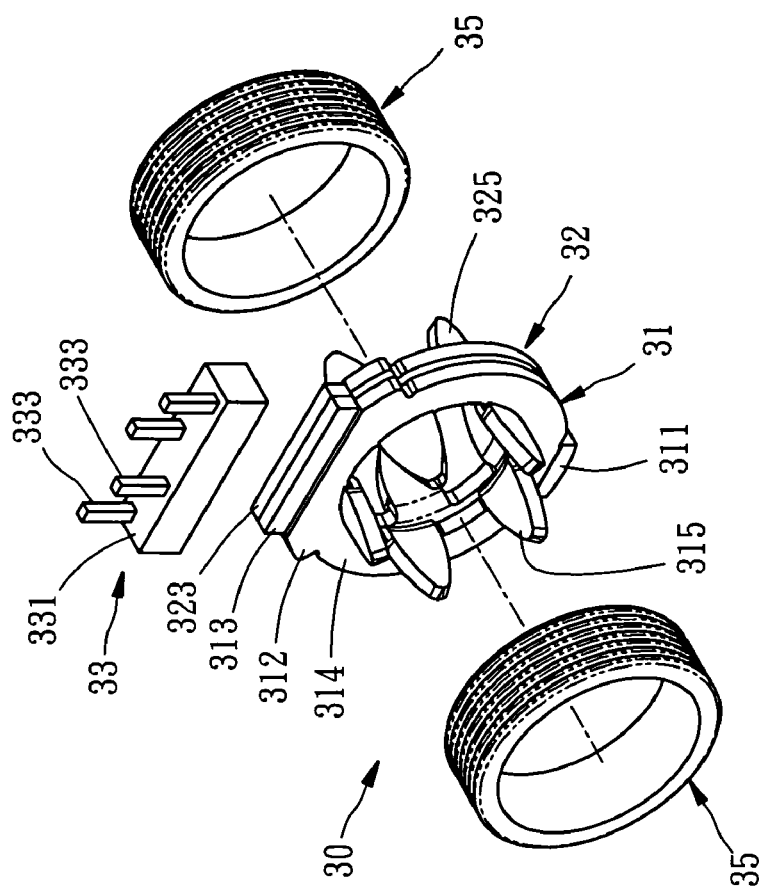
FIG. 3 is an exploded view of a part of the motor in accordance with the present invention.
Figure 2:
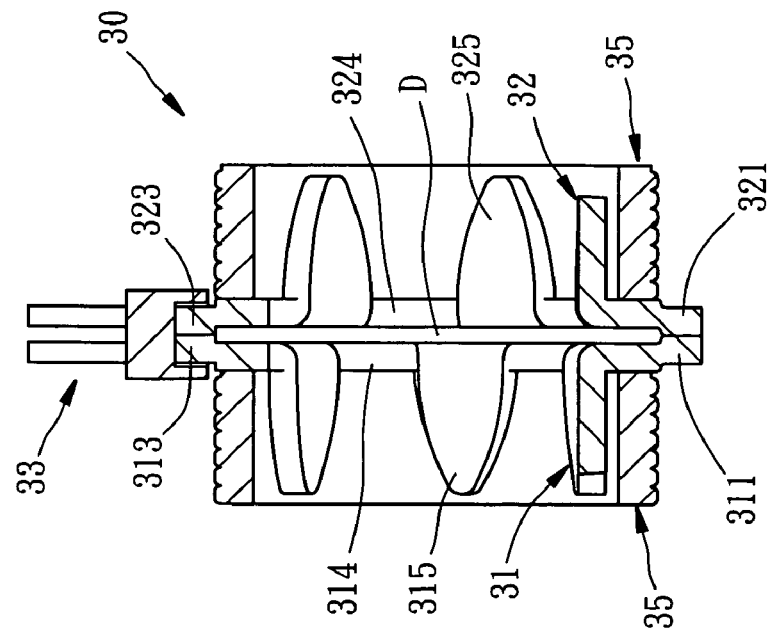
FIG. 2 is a sectional view of a part of the motor in accordance with the present invention.
Figure 4:
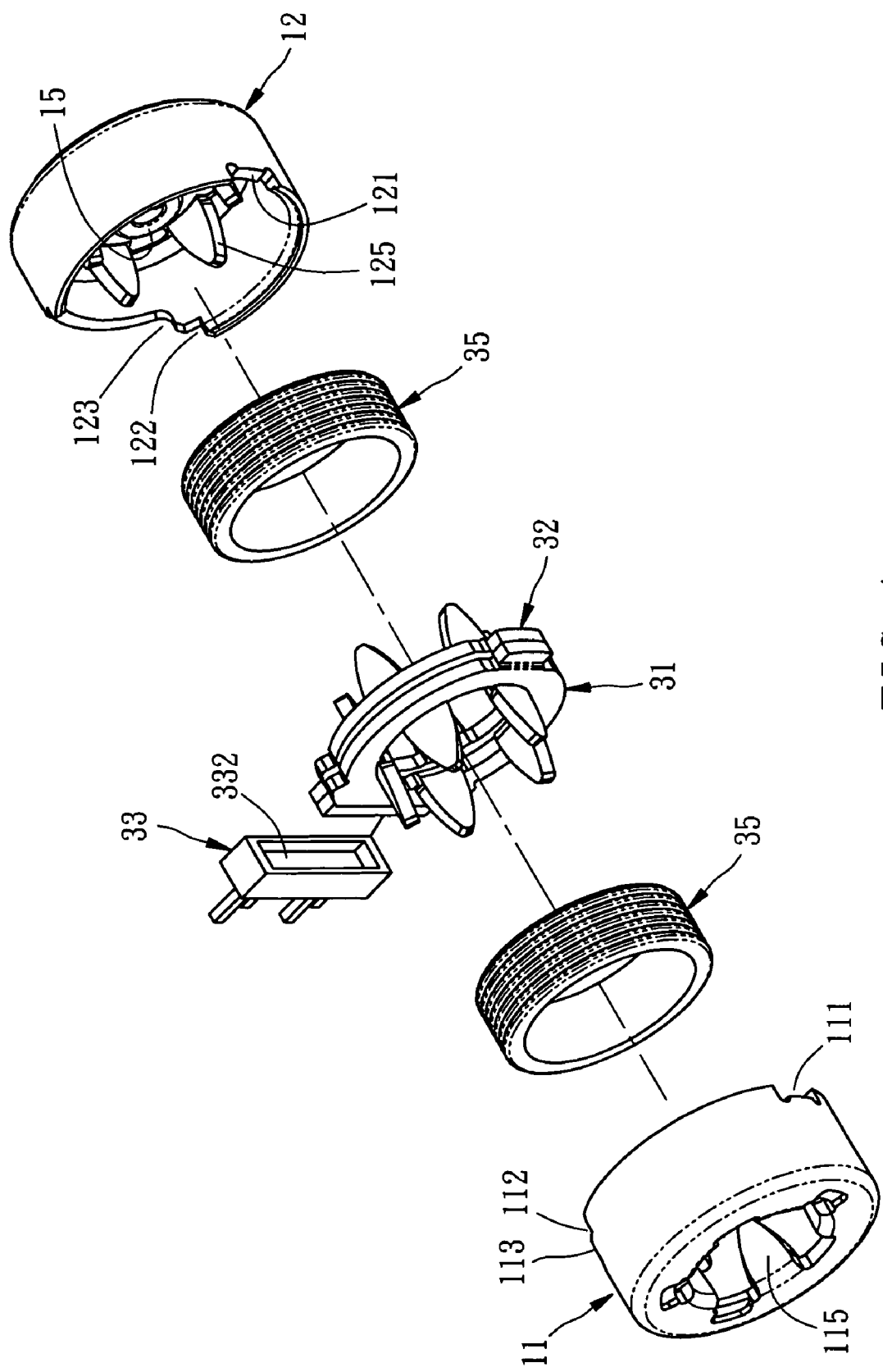
FIG. 4 is another partial exploded view of the motor in accordance with the present invention.

Referring to FIGS. 1~4, a motor in accordance with the present invention is shown comprising a housing 10, a stator 30 and a rotor 50.

The housing 10 is formed of a first shell 11 and a second shell 12, defining therein an accommodation space. The first shell 11 has two opposing locating notches 111 and 112, an escape hole 113, and a plurality of pole claws 115. The second shell 12 has two opposing locating notches 121 and 122 disposed at one side, namely, the front side, an escape hole 123, a plurality of pole pawls 125 and an axial center axle bearing 15. Further, the other side, namely, the bottom side of the second shell 12 is covered with a bottom plate 17.

Further, a bracket 20 may be connected to the free end of the first shell 11, forming a screw rod type motor set.

The stator 30 is comprised of a first yoke 31, a second yoke 32, a connecting device 33, and two coils 35. The first yoke 31 and the second yoke 32 are hollow plate members made of a magnetically conducting metal material, each comprising a first locating portion 311 or 321, a second locating portion 312 or 322, a terminal holder mounting portion 313 or 323, a race 314 or 324, and a plurality of pole pawls 315 or 325 respectively protruded from the race 314 or 324. The first yoke 31 and the second yoke 32 are stacked together, defining a gap D between the race 314 of the first yoke 31 and the race 324 of the second yoke 32. When the first yoke 31 and the second yoke 32 are stacked together, the first locating portions 311 and 321 are set in between the locating notches 111 and 121 of the housing 10, and the second locating portions 312 and 322 are set in between the locating notches 112 and 122 of the housing 10. The connecting device 33 comprises a terminal holder 331, which has a mounting hole 332 fastened to the terminal holder mounting portions 313 and 323 of the first yoke 31 and second yoke 32 of the stator 30, and a plurality of metal terminals 333 installed in the terminal holder 331. The two coils 35 are respectively mounted in between the first yoke 31 and second yoke 32 and the first shell 11 and second shell 12 of the housing 10, and respectively sleeved onto the pole pawls 315 and 325 of the first yoke 31 and second yoke 32 and the pole pawls 115 and 125 of the housing 10, and then the lead wires of the coils 35 are respectively electrically connected to the metal terminals 333 of the connecting device 33 by a soldering technique.

The rotor 50 is comprised of two magnets 51 and a transmission shaft 53. The magnets 51 are mounted on the transmission shaft 53. The rotor 50 is inserted through the first yoke 31 and the second yoke 32, and the transmission shaft 53 is supported in the axle bearing 15. Thus, the rotor 50 is rotatable relative to the stator 30.

The functioning and other features of the motor constructed subject to the aforesaid arrangement are described hereinafter.

At first, a gap D is defined between the races 314 and 324 of the first yoke 31 and second yoke 32 of the stator 30, reducing interference between the two adjacent magnetic fields, and therefore the invention improves the stepping precision of the motor.

Further, the connecting device 33 is separately made by means of an injection molding technique and then bonded to the terminal holder mounting portions 313 and 323 of the first yoke 31 and second yoke 32 of the stator 30, simplifying the fabrication and lowering magnetic resistance.

Further, the coils 35 are made by means of a thermal wire fusion technique, eliminating a coil holder, and therefore the invention provides much coin-coil space without increasing the motor size. Further, the first yoke 31 and the second yoke 32 are treated through a vacuum evaporation process, reducing defective insulation between the coils 35 and the yokes 31 and 32.

In general, the invention has the following advantages:

1. The motor of the present invention has a gap D defined between the races 314 and 324 of the first yoke 31 and the second yoke 32, reducing interference between the two adjacent magnetic fields, and therefore the motor has excellent stepping precision.

2. The connecting device 33 of the motor is separately made and then bonded to the terminal holder mounting portions 313 and 323 of the first yoke 31 and second yoke 32 of the stator 30, simplifying the fabrication and lowering magnetic resistance.

What is claimed is:

1. A motor comprising:

a housing, said housing being comprised of a first shell and a second shell and defining an accommodation space and an escape hole;

a stator, said stator comprising a first yoke, a second yoke, a connecting device and two coils, said first yoke and said second yoke being hollow metal plates made of a magnetic conductive material and stacked together, each of said first yoke and said second yoke integratedly comprising a first locating portion, a terminal holder mounting portion, a race and a plurality of pole pawls respectively extended from the race, the pole pawls of the first yoke extending from the race of the first yoke in a direction away from the second yoke, the pole pawls of the second yoke extending from the race of the second yoke in a direction away from the first yoke, said connecting device comprising a terminal holder fastened to the terminal holder mounting portions of said first yoke and said second yoke and a plurality of metal terminals installed in said terminal holder, said coils being respectively set between said first yoke and said first shell and between said second yoke and said second shell, said coils each having respective lead wires respectively electrically connected to said metal terminals; and a rotor inserted through said first yoke and said second yoke and rotatable relative to said stator, said rotor comprising a transmission shaft and a magnet mounted on said transmission shaft corresponding to said coils;

wherein the first locating portion and the terminal holder mounting portion of the first yoke are formed on one side of the race of the first yoke and face the second yoke, the first locating portion and the terminal holder mounting portion of the second yoke are formed on one side of the race of the second yoke and face the first yoke, the first locating portion and the terminal holder mounting portion of the first yoke respectively are stopped against the first locating portion and the terminal holder mounting portion of the second yoke respectively, the first yoke and the second yoke jointly defining a gap between the race of the first yoke and the race of the second yoke.

2. The motor as claimed in claim 1, wherein said coils respectively surround the pole pawls of said first yoke and said second yoke.

3. The motor as claimed in claim 1, wherein said terminal holder of the connecting device comprises a coupling hole bonded to the terminal holder mounting portions of said first yoke and said second yoke.

4. The motor as claimed in claim 1, wherein said first shell and said second shell of the housing each comprise a plurality of pole pawls for supporting said coils respectively.

5. The motor as claimed in claim 1, wherein said first shell of the housing comprises a locating notch; said first yoke and said second yoke each comprise a locating portion respectively fastened to the locating notch of said first shell.

\* \* \* \* \*